United States Patent
Takamatsu et al.

(10) Patent No.: US 9,119,194 B2
(45) Date of Patent: Aug. 25, 2015

(54) MOBILE COMMUNICATION SYSTEM, BASE STATION, MOBILE STATION, AND WIRELESS COMMUNICATION METHOD

(75) Inventors: Nobuaki Takamatsu, Koto-ku (JP); Masahiro Yagi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 555 days.

(21) Appl. No.: 13/515,800

(22) PCT Filed: Nov. 24, 2010

(86) PCT No.: PCT/JP2010/070897
§ 371 (c)(1),
(2), (4) Date: Aug. 24, 2012

(87) PCT Pub. No.: WO2011/074385
PCT Pub. Date: Jun. 23, 2011

(65) Prior Publication Data
US 2012/0307812 A1  Dec. 6, 2012

(30) Foreign Application Priority Data
Dec. 14, 2009  (JP) .................................. 2009-283299

(51) Int. Cl.
H04W 72/04 (2009.01)
H04L 5/00 (2006.01)
H04W 72/08 (2009.01)

(52) U.S. Cl.
CPC ............ *H04W 72/042* (2013.01); *H04L 5/003* (2013.01); *H04L 5/0007* (2013.01); *H04L 5/0082* (2013.01); *H04W 72/048* (2013.01); *H04W 72/08* (2013.01)

(58) Field of Classification Search
CPC . H04W 72/042; H04W 72/08; H04W 72/048; H04L 5/0082; H04L 5/003; H04L 5/0007
USPC ............ 370/337, 480; 375/267; 455/437, 512
See application file for complete search history.

(56) References Cited

U.S. PATENT DOCUMENTS 5,666,655 A * 9/1997 Ishikawa et al. .............. 455/512
7,746,765 B2    6/2010 Lim et al.
(Continued)

FOREIGN PATENT DOCUMENTS

CN   1248869 A   3/2000
CN   1549474 A   11/2004
(Continued)

OTHER PUBLICATIONS

International Preliminary Report on Patentability mailed on Jul. 19, 2012; International Application No. PCT/JP2010/070897.
(Continued)

*Primary Examiner* — Jung Park
*Assistant Examiner* — Chuong M Nguyen
(74) *Attorney, Agent, or Firm* — Studebaker & Brackett PC (57) ABSTRACT

A base station (12) performs communication to and from a mobile station via at least a part of a plurality of radio channels. The base station (12) includes: a channel allocation section (30) for allocating a radio channel having an allocation effective period of two or more frames to the mobile station; and a channel notification section (34) for notifying the mobile station of a radio channel newly allocated by the channel allocation section (30) in response to an expiration of the allocation effective period of the radio channel which has been allocated by the channel allocation section (30). The mobile station uses the radio channel notified from the base station (12) for communicating to and from the base station (12) until an allocation effective period of the new radio channel expires.

9 Claims, 7 Drawing Sheets

(56) References Cited

U.S. PATENT DOCUMENTS

| | | | |
|---|---|---|---|
| 2005/0111492 A1* | 5/2005 | Kang et al. | 370/480 |
| 2006/0126553 A1 | 6/2006 | Lim et al. | |
| 2006/0258382 A1 | 11/2006 | Zhang et al. | |
| 2008/0161003 A1* | 7/2008 | Brueck et al. | 455/437 |
| 2009/0285322 A1* | 11/2009 | Imamura et al. | 375/267 |
| 2011/0051687 A1 | 3/2011 | Nakasato | |
| 2013/0294217 A1 | 11/2013 | Imamura et al. | |

FOREIGN PATENT DOCUMENTS

| | | | |
|---|---|---|---|
| CN | 101346919 A | 1/2009 | |
| EP | 0986192 A2 | 3/2000 | |
| JP | 10-079970 A | 3/1998 | |
| JP | 10079970 A * | 3/1998 | H04Q 7/28 |
| JP | 2008-523765 A | 7/2008 | |
| JP | 2009-290339 A | 12/2009 | |
| WO | 2009/096139 A1 | 8/2009 | |

OTHER PUBLICATIONS

English translation of the Written Opinion of the International Searching Authority mailed on Nov. 1, 2011; International Application No. PCT/JP2010/070897.

International Search Report; PCT/JP2010/070897; Jan. 11, 2011.

The First Office Action issued by the Chinese Patent Office on Jun. 16, 2014, which corresponds to Chinese Patent Application No. 201080056867.9 and is related to U.S. Appl. No. 13/515,800; with English language concise explanation.

* cited by examiner

|  | Slot1 | Slot2 | Slot3 | Slot4 |
|---|---|---|---|---|
| Sch1 | CCH | CCH | CCH | CCH |
| Sch2 | EXCH | | | |
| Sch3 | ANCH | | | |
| Sch4 | EXCH | | | |
| Sch5 | EXCH | | | |
| Sch6 | EXCH | | | |
| Sch7 | EXCH | EXCH | | |
| Sch8 | EXCH | EXCH | | |
| Sch9 | EXCH | EXCH | | |
| Sch10 | | EXCH | | |
| Sch11 | | EXCH | | |
| Sch12 | | EXCH | | |
| Sch13 | | EXCH | | |
| Sch14 | | EXCH | | |
| Sch15 | | | | |
| Sch16 | | | | |
| Sch17 | | | | |
| Sch18 | | | | |

←RECEIVE→ | STOP RECEIVING→

MOBILE COMMUNICATION SYSTEM, BASE STATION, MOBILE STATION, AND WIRELESS COMMUNICATION METHOD

TECHNICAL FIELD

The present invention relates to a mobile communication system, a base station, a mobile station, and a wireless communication method.

BACKGROUND ART

In some mobile communication systems, a base station can change a radio channel allocated to a mobile station for each frame.

For example, Patent Literature 1 describes (particularly in paragraph 0003) that the base station transmits the uplink MAP message for notifying of the uplink access information (radio channel to be allocated in the uplink frame) and the downlink MAP message for notifying of the downlink access information (radio channel to be allocated in the downlink frame) to the mobile station in every frame so that the common channel can be shared among the respective mobile stations for each frame.

CITATION LIST

Patent Document

Patent Literature 1: JP 2008-523765A (in particular, Paragraph 0003)

SUMMARY OF INVENTION

Technical Problem

However, in the above-mentioned conventional mobile communication system, the base station needs to notify the mobile station of the radio channel to be allocated to the mobile station in every frame. Consequently, a part of the radio resource needs to be spared in every frame in order to notify of the radio channel.

The present invention has been made in view of the above-mentioned problem, and has an object to provide a mobile communication system, a base station, a mobile station, and a channel allocation method which are capable of reducing a radio resource required for notification of a radio channel.

Solution to Problem

In order to solve the above-mentioned problem, according to the present invention, there is provided a mobile communication system, including a base station and a mobile station, which perform communication with each other via at least a part of a plurality of radio channels, in which the base station includes: channel allocation means for allocating a radio channel having an allocation effective period of two or more frames to the mobile station; and channel notification means for notifying the mobile station of a radio channel newly allocated by the channel allocation means in response to an expiration of the allocation effective period of the radio channel which has been allocated by the channel allocation means, and the mobile station includes wireless communication means for using the radio channel notified from the base station for communicating to and from the base station until an allocation effective period of the radio channel expires.

According to the present invention, the allocation effective period of two or more frames is provided to the radio channel to be allocated to the mobile station so that a transmission frequency of the radio channel from the base station to the mobile station can be lowered. Therefore, according to the present invention, it is possible to reduce a radio resource required for the notification of the radio channel.

Further, in an aspect of the present invention, each of the plurality of radio channels belongs to any one of a plurality of time slots defined by a time division multiple access scheme, and the wireless communication means stops receiving, in frames subsequent to a frame in which the radio channel is notified from the base station, in time slots except for a time slot to which the radio channel belongs, a radio signal transmitted from the base station until the allocation effective period of the notified radio channel expires.

According to this aspect, the mobile station does not need to receive the radio signal in all downlink slots all the time, and hence it is possible to reduce power consumption of the mobile station.

Further, according to an aspect of the present invention, the base station further includes effective period determination means for determining the allocation effective period of the radio channel allocated by the channel allocation means based on information on a quality of the communication between the base station and the mobile station, and the channel notification means notifies the mobile station of the radio channel allocated by the channel allocation means and the allocation effective period of the radio channel determined by the effective period determination means.

According to this aspect, the allocation effective period of the radio channel is changed depending on the quality of communication between the base station and the mobile station, and hence the throughput of communication can be enhanced.

Further, according to an aspect of the present invention, the information on the quality of the communication between the base station and the mobile station includes a reception quality of a radio signal transmitted from the mobile station and received by the base station.

Further, according to an aspect of the present invention, the information on the quality of the communication between the base station and the mobile station includes a moving speed of the mobile station.

Further, according to an aspect of the present invention, the information on the quality of the communication between the base station and the mobile station includes a total number of the mobile stations connected to the base station.

According to the present invention, there is also provided a base station for performing communication to and from a mobile station via at least a part of a plurality of radio channels, the base station including: channel allocation means for allocating a radio channel having an allocation effective period of two or more frames to the mobile station; and channel notification means for notifying the mobile station of a radio channel newly allocated by the channel allocation means in response to an expiration of the allocation effective period of the radio channel which has been allocated by the channel allocation means.

According to the present invention, there is also provided a mobile station for performing communication to and from a base station via at least a part of a plurality of radio channels, the base station includes: channel allocation means for allocating a radio channel having an allocation effective period of two or more frames to the mobile station; and channel notification means for notifying the mobile station of a radio channel newly allocated by the channel allocation means in response to an expiration of the allocation effective period of the radio channel which has been allocated by the channel allocation means, and the mobile station uses the radio channel notified from the base station for the communication to and from the base station until the allocation effective period of the radio channel expires.

According to the present invention, there is also provided a wireless communication method for use in communication between a first communication device and a second communication device, which is performed via at least a part of a plurality of radio channels, the wireless communication method including the steps of: allocating, by the first communication device, a radio channel having an allocation effective period of two or more frames to the second communication device; notifying, by the first communication device, the second communication device of a radio channel newly allocated to the second communication device in response to an expiration of the allocation effective period of the radio channel which has been allocated to the second communication device; and using, by the second communication device, the radio channel notified from the first communication device for communicating to and from the first communication device until an allocation effective period of the radio channel expires.

DESCRIPTION OF EMBODIMENTS

Hereinafter, referring to the drawings, detailed description is given of an embodiment of the present invention.

Figure 1:
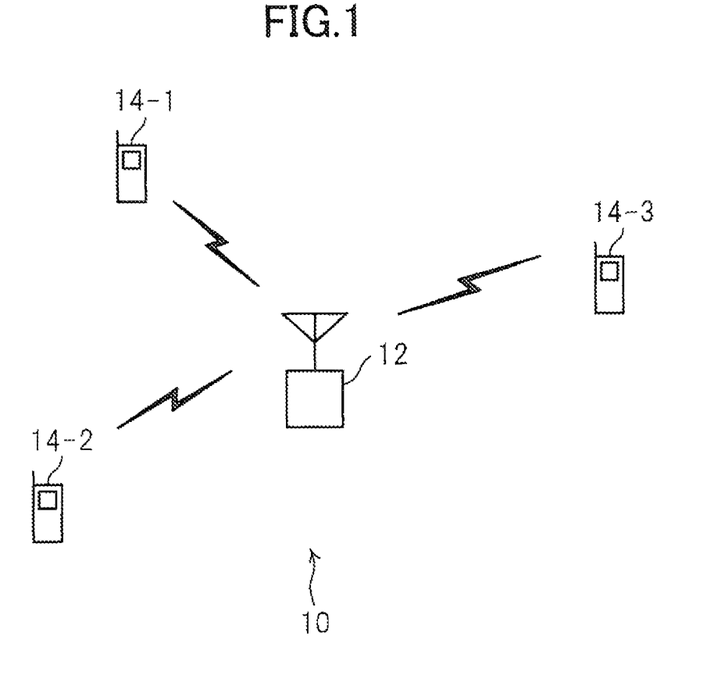
FIG. 1 A diagram illustrating a configuration of a mobile communication system according to an embodiment of the present invention.

FIG. 1 is a diagram illustrating a configuration of a mobile communication system 10 according to the embodiment of the present invention. As illustrated in FIG. 1, the mobile communication system 10 includes a base station 12 and a plurality of mobile stations 14 (in the figure, only mobile stations 14-1 to 14-3 are illustrated).

Each base station 12 wirelessly communicates to/from the mobile station 14 located within a cell of the base station 12 by the orthogonal frequency division multiple access (OFDMA) scheme and the time division multiple access/time division duplex (TDMA/TDD) scheme. Note that, examples of the mobile station 14 include a mobile phone, a communication card, and a personal digital assistant having a communication function built therein.

Figure 2:
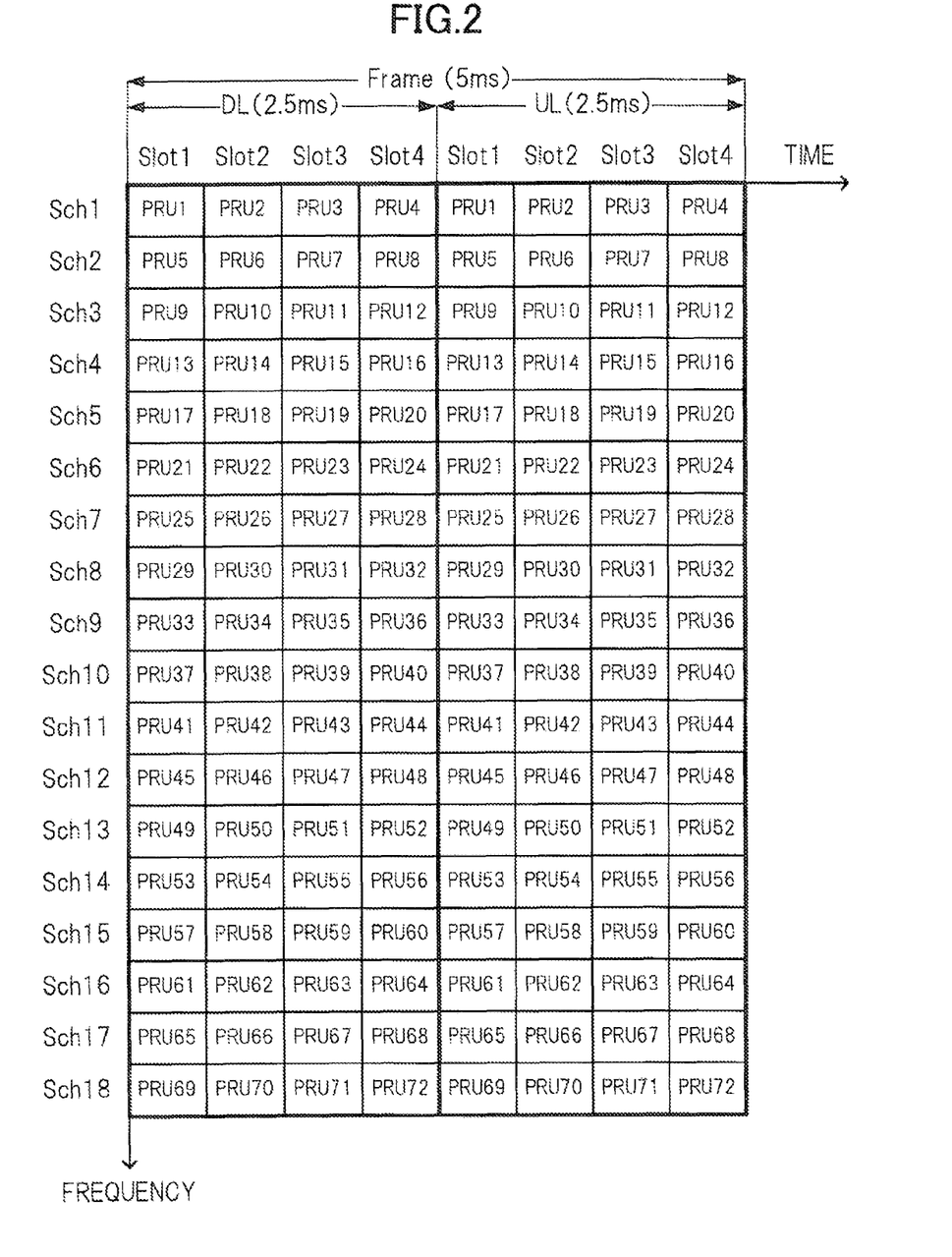
FIG. 2 A diagram illustrating a radio channel structure in the mobile communication system according to the present embodiment.

FIG. 2 is a diagram illustrating a radio channel structure in the mobile communication system 10 (horizontal axis: time, vertical axis: frequency). As illustrated in FIG. 2, in the mobile communication system 10, a TDMA frame having a predetermined period (in the figure, 5 ms) is sectioned into an uplink subframe (2.5 ms) and a downlink subframe (2.5 ms). Further, each of the subframes is sectioned into a plurality of time slots (in the figure, Slot1 to Slot4). In addition, a plurality of OFDMA subchannels (in the figure, Sch1 to Sch18) are defined in a predetermined frequency band.

The minimum unit of a radio channel allocated to the mobile station 14 by the base station 12 is called a physical resource unit (PRU). Each PRU belongs to any one of the time slots (Slot1 to Slot4) and any one of the subchannels (Sch1 to Sch18). Note that, it is defined that, both in the uplink subframe and in the downlink subframe, 72 PRUs are each identified by a consecutive PRU number starting from 1 (1, 2, 3, . . . ), for example. The PRUs in the uplink and downlink having the same PRU number are used in pairs. In other words, the PRUs are allocated in the uplink and downlink in a symmetric manner.

Of those PRUs, the PRUs belonging to a specific subchannel (in the figure, Sch1) are each defined as a common channel (CCH) to be shared among one or more mobile stations 14. Further, a transmission/reception timing of the CCH (hereinafter, simply referred to as "CCH timing"), which is repeated every predetermined time period and does not overlap with those of neighboring base stations, is allocated to the base station 12. Specifically, any one of 80 pairs of timeslots contained in consecutive 20 frames (four pairs of timeslots in the uplink and downlink×20 frames) is allocated to the base station 12 as the CCH timing. The base station 12 then transmits/receives various kinds of control signals to/from the one or more mobile stations 14 located within the cell of the base station 12 at the CCH timing allocated to the base station 12 every 100 ms.

Meanwhile, the PRUs belonging to the other subchannels (in the figure, Sch2 to Sch18) than the above-mentioned specific subchannel are each used as an individual channel (ICH) allocated individually to each of the mobile stations 14. Examples of the ICHs include anchor channels (ANCHs), one of which is to be allocated to each of the mobile stations 14 in principle as an individual control channel and used for transmitting control information, and extra channels (EX-CHs), one or more of which are to be allocated to each of the mobile stations 14 as communication channels and used mainly for transmitting communication data.

Note that, when starting communication, the base station 12 notifies the mobile station 14 of the PRU to be allocated as the ANCH (individual control channel) (which may be changed during the communication). On the other hand, the base station 12 notifies the mobile station 14 of the PRU to be allocated as the EXCH (one of the communication channels) in channel allocation information called MAP indicating whether or not to allocate each of the 72 PRUs (for example, a 72-bit bitmap in which the PRU to be allocated as the EXCH is indicated as "1", and the PRU not to be allocated to as the EXCH is indicated as "0"). When changing the PRU allocated to the mobile station 14 as the EXCH, the base station 12 transmits the MAP to the mobile station 14 via the ANCH.

Note that, in the mobile communication system 10, an allocation effective period of two or more frames is provided to the PRU to be allocated to the mobile station 14 as the EXCH so that a transmission frequency of the MAP from the base station 12 to the mobile station 14 (notification frequency of the PRU) can be lowered, to thereby reduce a radio resource required for the notification of the PRU.

Further, the mobile station 14 may stop receiving, in frames subsequent to a frame in which the PRU for the EXCH is notified from the base station 12 (frame in which the MAP is received from the base station 12), in the timeslots except for the timeslot to which the PRU for the EXCH belongs, the radio signal transmitted from the base station 12 until the allocation effective period of the PRU for the EXCH expires. With this configuration, the mobile station 14 does not need to receive the radio signal in all downlink slots all the time, and hence it is possible to reduce power consumption.

In the following, detailed description is given of configurations of the base station 12 and the mobile station 14 for realizing the above-mentioned processing.

Figure 3:
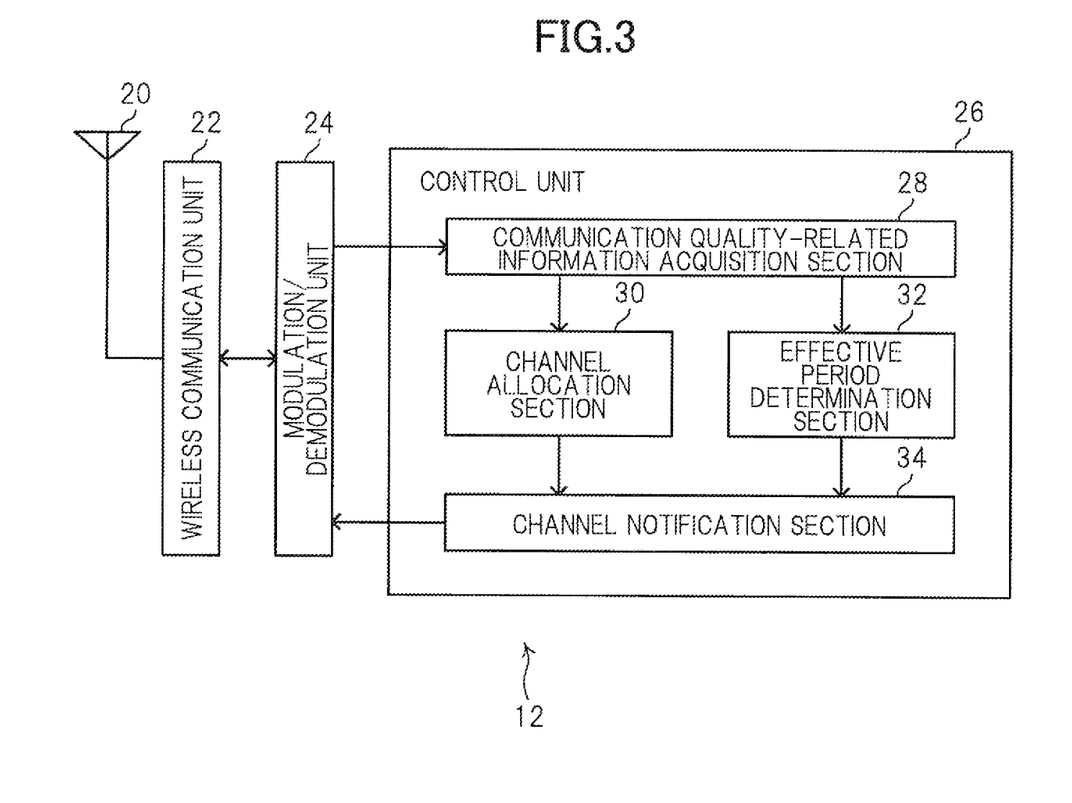
FIG. 3 A functional block diagram illustrating a base station according to the present embodiment.

FIG. 3 is a functional block diagram illustrating the base station 12. As illustrated in FIG. 3, the base station 12 includes an antenna 20, a wireless communication unit 22, a modulation/demodulation unit 24, and a control unit 26 (which includes a communication quality-related information acquisition section 28, a channel allocation section 30, an effective period determination section 32, and a channel notification section 34).

The antenna 20 receives the radio signal transmitted from the mobile station 14, and outputs the received radio signal to the wireless communication unit 22. Further, the antenna 20 transmits, to the mobile station 14, the radio signal supplied from the wireless communication unit 22.

The wireless communication unit 22 includes a low-noise amplifier, a power amplifier, a frequency converter, a bandpass filter, an A/D converter, and a D/A converter. The wireless communication unit 22 amplifies the radio signal input from the antenna 20 by the low-noise amplifier, and then down-converts the radio signal to an intermediate frequency signal. The wireless communication unit 22 converts the intermediate frequency signal into a digital signal, and then outputs the digital signal to the modulation/demodulation unit 24. Further, the wireless communication unit 22 converts a digital signal input from the modulation/demodulation unit 24 into an analog signal, and then up-converts the analog signal to a radio signal. The wireless communication unit 22 amplifies the radio signal to a transmission output level by the power amplifier, and then supplies the radio signal to the antenna 20.

The modulation/demodulation unit 24 includes a Fast Fourier Transform (FFT) unit, an Inverse Fast Fourier Transform (IFFT) unit, a serial/parallel converter, a parallel/serial converter, and an error detection unit. The modulation/demodulation unit 24 carries out, on the digital signal input from the wireless communication unit 22, serial/parallel conversion, removal of a guard interval (GI), primary demodulation (Fast Fourier Transform), parallel/serial conversion, secondary demodulation (symbol demapping), decoding, error detection, and the like. The modulation/demodulation unit 24 outputs the resultant received data to the control unit 26 and an upper layer (not shown). Further, the modulation/demodulation unit 24 carries out, on data to be transmitted to the mobile station 14, which has been input from the control unit 26 and the upper layer, addition of an error detection code, coding, primary modulation (symbol mapping), serial/parallel conversion, secondary modulation (Inverse Fast Fourier Transform), addition of the GI, parallel/serial conversion, and the like. The modulation/demodulation unit 24 outputs the resultant digital signal to the wireless communication unit 22.

The control unit 26 includes, for example, a CPU and programs for controlling the operation of the CPU, and controls respective units of the base station 12. In particular, the control unit 26 functionally includes the communication quality-related information acquisition section 28, the channel allocation section 30, the effective period determination section 32, and the channel notification section 34, and performs allocation and notification of the PRUs to the mobile station 14, and the like.

The communication quality-related information acquisition section 28 acquires information on a quality of communication between the base station 12 and the mobile station 14. Examples of the information on the quality of communication between the base station 12 and the mobile station 14 include a reception quality of the radio signal transmitted from the mobile station 14 and received by the base station 12, an amount of communication data transmitted/received between the base station 12 and the mobile station 14, a moving speed of the mobile station 14, and the total number of the mobile stations 14 connected to the base station 12.

Note that, examples of the reception quality of the radio signal transmitted from the mobile station 14 and received by the base station 12 include a received signal strength indication (RSSI), a signal to interference and noise ratio (SINR), a frame error rate (FER), and the like. Those reception qualities can be acquired based on a complex symbol sequence obtained by the primary demodulation (Fast Fourier Transform) in the modulation/demodulation unit 24, the result of the error detection in the modulation/demodulation unit 24, and the like.

Further, the moving speed of the mobile station 14 can be estimated from a propagation delay time of the radio signal transmitted from the mobile station 14. The radio signal transmitted from the mobile station 14 contains a training symbol (known signal) for frame synchronization, and hence the propagation delay time of the radio signal can be acquired based on a correlation value of the complex symbol sequence obtained by the primary demodulation in the modulation/demodulation unit 24 and the training symbol.

The channel allocation section 30 determines, based on the information on the quality of communication between the base station 12 and the mobile station 14, which is acquired by the communication quality-related information acquisition section 28, the PRU to be allocated to the mobile station 14 as the ANCH (individual control channel) or the EXCH (communication channel). For example, when the base station 12 starts communicating to/from the mobile station 14, the channel allocation section 30 allocates, as the ANCH, from among the PRUs which have not been allocated yet to any of the mobile stations 14 (available PRUs), the PRU having the lowest RSSI to the mobile station 14. Further, the channel allocation section 30 allocates, as the EXCHs, based on the SINR of the radio signal transmitted from the mobile station 14, the amount of communication data transmitted/received between the base station 12 and the mobile station 14, and the like, one or more PRUs to the mobile station 14.

The effective period determination section 32 determines the allocation effective period of the PRUs (hereinafter, referred to as "MAP effective period") to be allocated as the EXCHs by the channel allocation section 30. The MAP effective period determined here may be a fixed value of two or more frames which is not to be changed during the communication, or a variable value of one or more frames which may be changed during the communication (it is not always necessary that the variable value have two or more frames). Further, the base station 12 may notify the mobile station 14 of information as to whether the effective period determination section 32 sets the MAP effective period to a fixed value or a variable value (which includes a value of the fixed value in the case where the MAP effective period is set to the fixed value), when starting the communication or in synchronization with the CCH timing.

Note that, when the MAP effective period is set to a variable value, the effective period determination section 32 may determine the MAP effective period based on the information on the quality of communication between the base station 12 and the mobile station 14, which is acquired by the communication quality-related information acquisition section 28. For example, as the reception quality of the radio signal transmitted from the mobile station 14 and received by the base station 12 becomes higher, the effective period determination section 32 may set the MAP effective period longer. Alternatively, as the moving speed of the mobile station 14 becomes lower, the effective period determination section 32 may set the MAP effective period longer. Still alternatively, as the total number of the mobile stations 14 connected to the base station 12 becomes lower, the effective period determination section 32 may set the MAP effective period longer. With such settings, the MAP effective period is changed depending on the quality of communication between the base station 12 and the mobile station 14, and hence the throughput of communication can be enhanced.

The channel notification section 34 generates a predetermined channel notification message so that the mobile station 14 is notified of the PRU allocated by the channel allocation section 30 as the ANCH or the EXCH, and outputs the predetermined channel notification message to the modulation/demodulation unit 24. For example, when the base station 12 starts communicating to/from the mobile station 14, the channel notification section 34 generates a message containing a PRU number indicating the PRU allocated as the ANCH, and then transmits the message to the mobile station 14. Further, the channel notification section 34 generates a message containing the MAP which indicates the PRU allocated as the EXCH, and intermittently transmits the message to the mobile station 14. Specifically, in a case where the MAP effective period is a fixed value, the channel notification section 34 generates a message containing new MAP in response to the expiration of the MAP effective period, and transmits the message to the mobile station 14 via the ANCH. On the other hand, in a case where the MAP effective period is a variable value, the channel notification section 34 generates a message containing new MAP and an effective period of the MAP in response to the expiration of an effective period of the MAP most recently transmitted to the mobile station 14, and transmits the message to the mobile station 14 via the ANCH.

Figure 4:
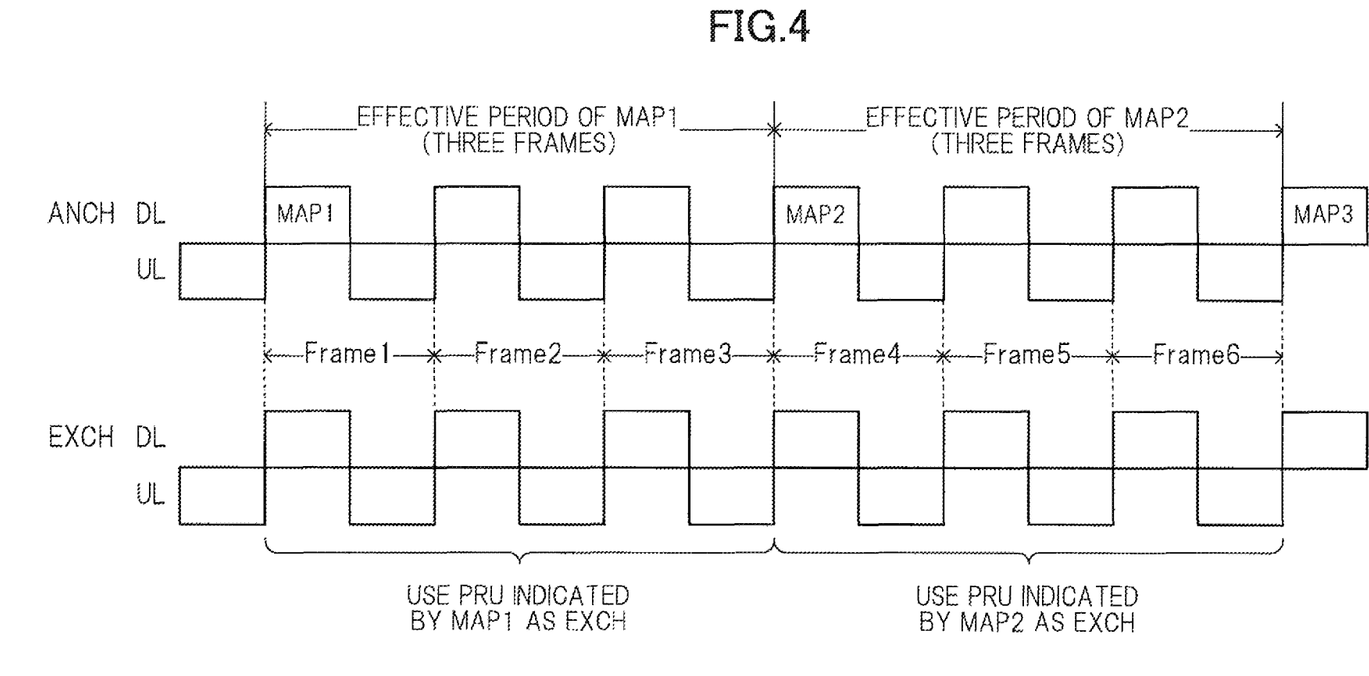
FIG. 4 A diagram illustrating an example of a MAP effective period and a transmission timing of MAP.

FIG. 4 is a diagram illustrating an example of the MAP effective period and a transmission timing of the MAP. In the example illustrated in FIG. 4, the MAP effective period is fixed to three frames. In this case, the effective period of MAP1 transmitted in a downlink of Frame1 (downlink subframe) is a period from the downlink of Frame1 to an uplink of Frame3 (uplink subframe). Then, in response to the expiration of the effective period of MAP1, new MAP2 is transmitted in a downlink of Frame4. Further, after an effective period of MAP2 expires in an uplink of Frame6, new MAP3 is transmitted in a downlink of Frame7.

Figure 5:
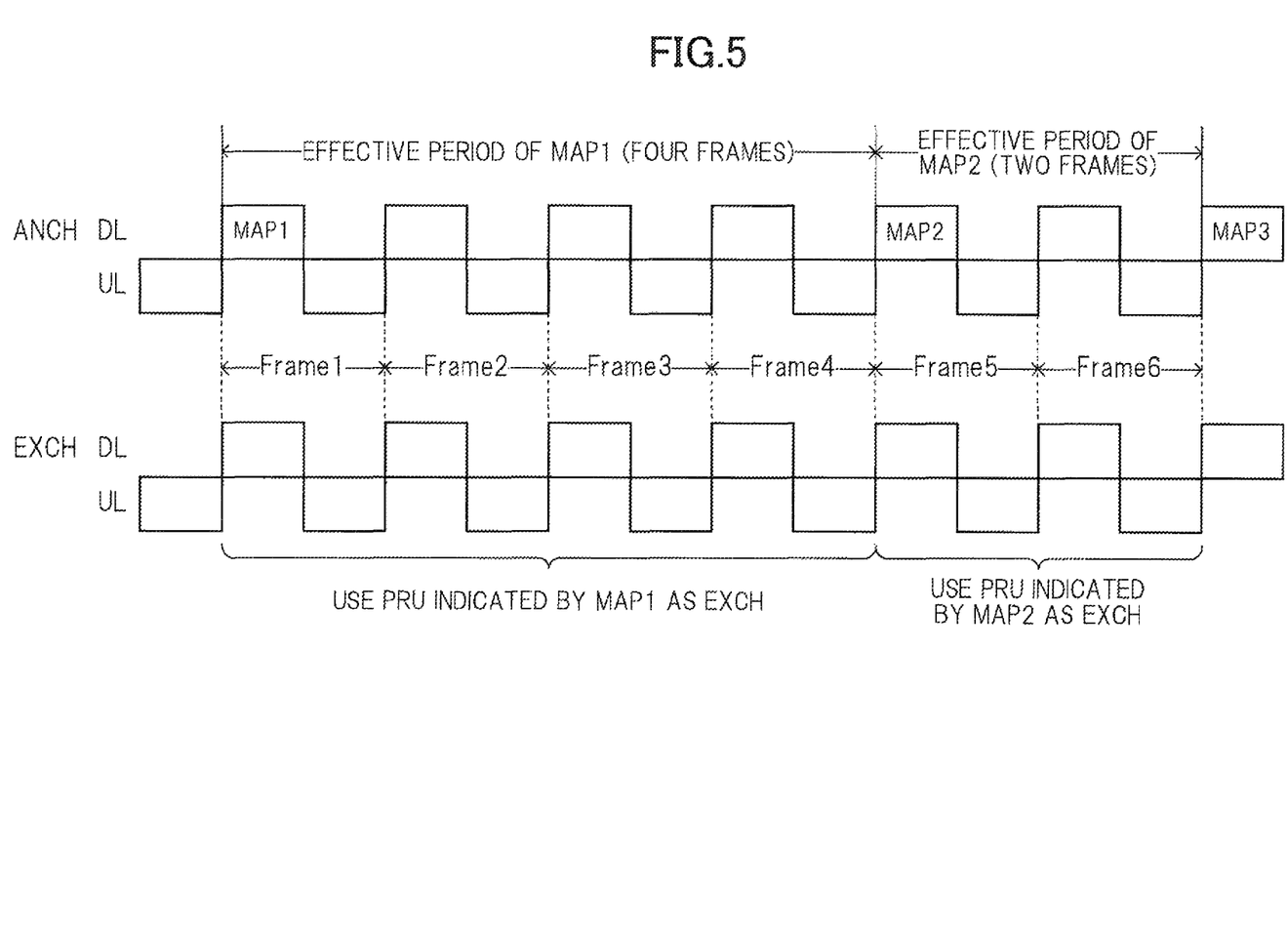
FIG. 5 A diagram illustrating another example of the MAP effective period and the transmission timing of the MAP.

FIG. 5 is a diagram illustrating another example of the MAP effective period and the transmission timing of the MAP. In the example illustrated in FIG. 5, the MAP effective period is variable, and the effective period of MAP1 is four frames and the effective period of subsequent MAP2 is two frames. In this case, the effective period of MAP1 transmitted in the downlink (downlink subframe) of Frame1 is a period from the downlink of Frame1 to an uplink (uplink subframe) of Frame4. Then, in response to the expiration of the effective period of MAP1, new MAP2 is transmitted in a downlink of Frame5. Further, after the effective period of MAP2 expires in the uplink of Frame6, new MAP3 is transmitted in the downlink of Frame7.

Figure 6:
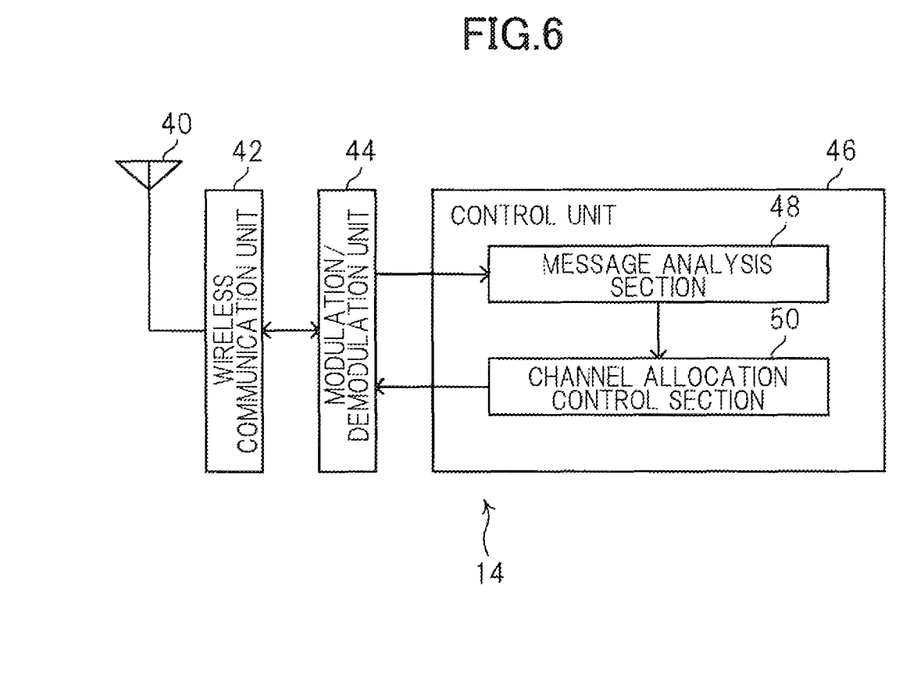
FIG. 6 A functional block diagram illustrating a mobile station according to the present embodiment.

Next, FIG. 6 is a functional block diagram illustrating the mobile station 14. As illustrated in FIG. 6, the mobile station 14 includes an antenna 40, a wireless communication unit 42, a modulation/demodulation unit 44, and a control unit 46 (which includes a message analysis section 48 and a channel allocation control section 50).

The antenna 40 receives the radio signal transmitted from the base station 12, and outputs the received radio signal to the wireless communication unit 42. Further, the antenna 40 transmits the radio signal supplied from the wireless communication unit 42 to the base station 12.

The wireless communication unit 42 includes a low-noise amplifier, a power amplifier, a frequency converter, a bandpass filter, an A/D converter, and a D/A converter. The wireless communication unit 42 amplifies the radio signal input from the antenna 40 by the low-noise amplifier, and then down-converts the radio signal to an intermediate frequency signal. The wireless communication unit 42 converts the intermediate frequency signal into a digital signal, and then outputs the digital signal to the modulation/demodulation unit 44. Further, the wireless communication unit 42 converts the digital signal input from the modulation/demodulation unit 44 into an analog signal, and then up-converts the analog signal to a radio signal. The wireless communication unit 42 amplifies the radio signal to a transmission output level by the power amplifier, and then supplies the radio signal to the antenna 40.

The modulation/demodulation unit 44 includes an FFT unit, an IFFT unit, a serial/parallel converter, a parallel/serial converter, and an error detection unit. The modulation/demodulation unit 44 carries out, on the digital signal input from the wireless communication unit 42, serial/parallel conversion, removal of a GI, primary demodulation (Fast Fourier Transform), parallel/serial conversion, secondary demodulation (symbol demapping), decoding, error detection, and the like. The modulation/demodulation unit 44 outputs the resultant received data to the control unit 46 and an upper layer (not shown). Further, the modulation/demodulation unit 44 carries out, on data to be transmitted to the base station 12, which has been input from the control unit 46 and the upper layer, addition of an error detection code, coding, primary modulation (symbol mapping), serial/parallel conversion, secondary modulation (Inverse Fast Fourier Transform), addition of the GI, parallel/serial conversion, and the like. The modulation/demodulation unit 44 outputs the resultant digital signal to the wireless communication unit 42.

The control unit 46 includes, for example, a CPU and programs for controlling the operation of the CPU, and controls respective units of the mobile station 14. In particular, the control unit 46 functionally includes the message analysis section 48 and the channel allocation control section 50, and controls the use of PRUs allocated from the base station 12 the reception timing of the radio signal transmitted from the base station 12, and the like.

The message analysis section 48 extracts, from received data input from the modulation/demodulation unit 44, various messages from the base station 12, and analyzes the contents of the messages. For example, the message analysis section 48 acquires, from the received data, the message containing the PRU number indicating the PRU to be allocated from the base station 12 as the ANCH. The message analysis section 48 outputs the PRU number contained in the message to the channel allocation control section 50. Further, the message analysis section 48 acquires, from the received data, the message containing the MAP which indicates the PRU to be allocated from the base station 12 as the EXCH and the effective period of the MAP. The message analysis section 48 outputs the MAP and the effective period of the MAP which are contained in the message to the channel allocation control section 50.

The channel allocation control section 50 controls, based on the information input from the message analysis section 48, the use of the PRUs each allocated to the mobile station 14 from the base station 12 as the ANCH or EXCH. For example, the channel allocation control section 50 controls the wireless communication unit 42 and the modulation/demodulation unit 44 so that control information is transmitted/received to/from the base station 12 via the PRU for the ANCH indicated by the PRU number input from the message analysis section 48. Further, the channel allocation control section 50 controls the wireless communication unit 42 and the modulation/demodulation unit 44 so that communication data is transmitted/received to/from the base station 12 via the PRU for the EXCH indicated by the MAP input from the message analysis section 48.

For example, in the example illustrated in FIG. 4 (example in which the MAP effective period is fixed to three frames), at a timing of the downlink of Frame1, MAP1 is input from the message analysis section 48 to the channel allocation control section 50. In this case, the channel allocation control section 50 instructs the wireless communication unit 42 and the modulation/demodulation unit 44 to use the PRU for the EXCH indicated by MAP1 for communicating to/from the base station 12, until the uplink of Frame3 in which the effective period of MAP1 expires. Then, when new MAP2 is input from the message analysis section 48 at a timing of the downlink of Frame4, the channel allocation control section 50 instructs the wireless communication unit 42 and the modulation/demodulation unit 44 to use the PRU for the EXCH indicated by MAP2 for communicating to/from the base station 12, until the uplink of Frame6 in which the effective period of MAP2 expires.

Further, in the example illustrated in FIG. 5 (example in which the MAP effective period is variable), at a timing of the downlink of Frame1, MAP1 and the effective period (four frames) of MAP1 are input from the message analysis section 48 to the channel allocation control section 50. In this case, the channel allocation control section 50 instructs the wireless communication unit 42 and the modulation/demodulation unit 44 to use the PRU for the EXCH indicated by MAP1 for communicating to/from the base station 12, until the uplink of Frame4 in which the effective period of MAP1 expires. Then, when new MAP2 and the new effective period (two frames) of MAP2 are input from the message analysis section 48 at a timing of the downlink of Frame5, the channel allocation control section instructs the wireless communication unit 42 and the modulation/demodulation unit 44 to use the PRU for the EXCH indicated by MAP2 for communicating to/from the base station 12, until the uplink of Frame6 in which the effective period of MAP2 expires.

Figure 7:
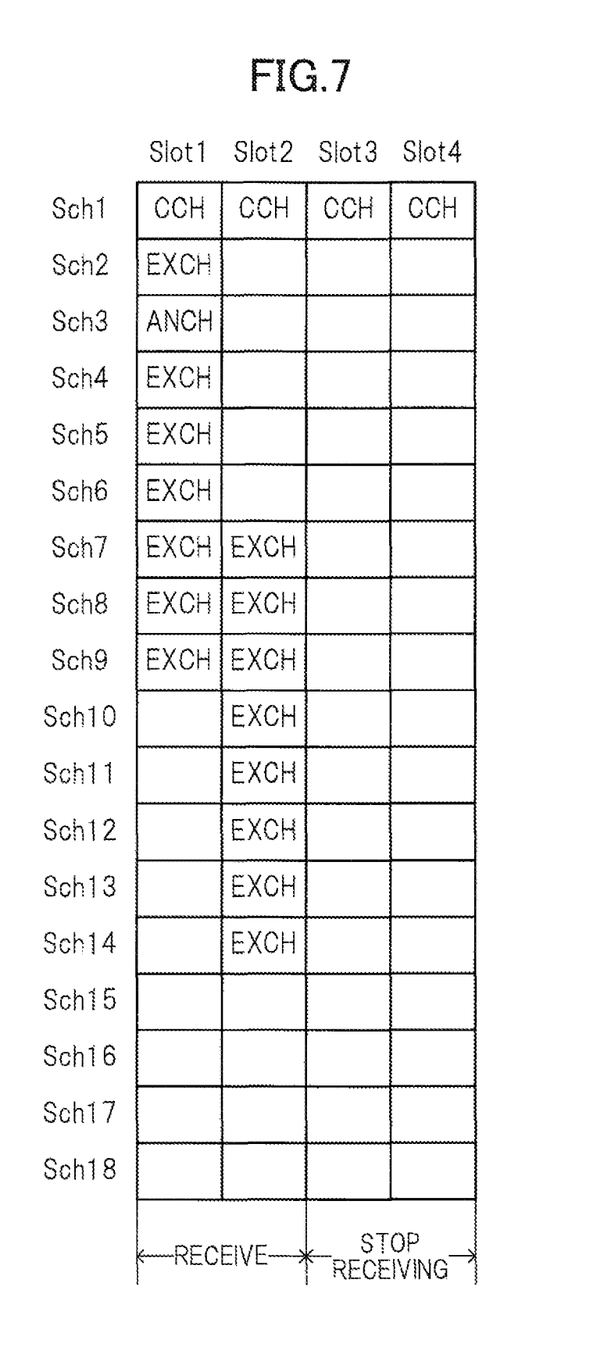
FIG. 7 A diagram illustrating an example of PRUs for EXCHs indicated by the MAP.

Note that, in the frames subsequent to the frame in which the MAP is received from the base station 12 (frame in which the PRU for the EXCH is notified from the base station 12), until the effective period of the MAP expires, the channel allocation control section 50 may cause the wireless communication unit 42 to stop receiving the radio signal transmitted from the base station 12, in the timeslots except for the timeslot to which the PRU for the EXCH indicated by the MAP belongs. For example, in the example illustrated in FIG. 4, when the PRUs for the EXCHs indicated by MAP1 are arranged in the positions illustrated in FIG. 7, the wireless communication unit 42 may stop receiving the radio signal transmitted from the base station 12 in Slot3 and Slot4 of the downlink of Frame2 and in Slot3 and Slot 4 of the downlink of Frame3 (timeslots to which the PRUs for EXCHs do not belong). With this configuration, the mobile station 14 does not need to receive the radio signal all the time in all the downlink slots (does not need to cause the wireless communication unit 42 to operate in the downlink slots in which there is no need to receive the radio signal), and hence the power consumption can be reduced. However, in the downlink of Frame1 in which MAP1 is received, the PRU for the EXCH indicated by the MAP1 cannot be known in advance, and hence the wireless communication unit 42 needs to receive the radio signal transmitted from the base station 12 in all the downlink slots (Slot1 to Slot4).

The mobile communication system 10 described above provides the PRU to be allocated to the mobile station 14 as the EXCH with the allocation effective period of two or more frames, and hence the transmission frequency of the MAP from the base station 12 to the mobile station 14 (notification frequency of the PRU) can be lowered, to thereby reduce the radio resource required for the notification of the PRU. Therefore, the base station 12 can transmit a larger amount of user data to the mobile station 14 through use of an unused radio resource, for example.

Note that, the present invention is not limited to the embodiment described above.

For example, the transmission of the MAP from the base station to the mobile station is only an example of a notification method for the radio channels, and another notification method may be employed. Moreover, the radio channel structure may be a structure different from the radio channel structure illustrated in FIG. 2.

Further, the present invention is not limited to the mobile communication system which employs the OFDMA scheme and the TDMA/TDD scheme, and is applicable to any type of mobile communication system in which a first communication device and a second communication device communicate with each other via at least a part of a plurality of radio channels.

The invention claimed is:

1. A mobile communication system, comprising a base station and a mobile station, which perform communication with each other via at least a part of a plurality of radio channels,
   wherein the base station includes:
      a channel allocation section configured to allocate a first radio channel having an allocation effective period of two or more frames to the mobile station; and
      a channel notification section configured to notify the mobile station of a second radio channel, having an allocation effective period of two or more frames to the mobile station, newly allocated by the channel allocation section when the allocation effective period of the first radio channel which has been allocated by the channel allocation section is expired, and
   wherein the mobile station includes a wireless communication section configured to use the first radio channels notified from the base station until an allocation effective period of the first radio channels expires and the second radio channels notified from the base station until an allocation effective period of the second radio channels expires.

2. The mobile communication system according to claim 1,
   wherein each of the plurality of radio channels belongs to any one of a plurality of time slots defined by a time division multiple access scheme, and
   wherein the wireless communication section stops receiving, in frames subsequent to a frame in which the radio channel is notified from the base station, in time slots except for a time slot to which the radio channel belongs, a radio signal transmitted from the base station until the allocation effective period of the notified radio channel expires.

3. The mobile communication system according to claim 1, wherein the base station further includes an effective period determination section configured to determine the allocation effective period of the radio channel allocated by the channel allocation section based on information on a quality of the communication between the base station and the mobile station, and wherein the channel notification section notifies the mobile station of the radio channel allocated by the channel allocation section and the allocation effective period of the radio channel determined by the effective period determination section.

4. The mobile communication system according to claim 3, wherein the information on the quality of the communication between the base station and the mobile station includes a reception quality of a radio signal transmitted from the mobile station and received by the base station.

5. The mobile communication system according to claim 3, wherein the information on the quality of the communication between the base station and the mobile station includes a moving speed of the mobile station.

6. The mobile communication system according to claim 3, wherein the information on the quality of the communication between the base station and the mobile station includes a total number of the mobile stations connected to the base station.

7. A base station for performing communication to and from a mobile station via at least a part of a plurality of radio channels, the base station comprising: a channel allocation section configured to allocate a first radio channel having an allocation effective period of two or more frames to the mobile station; and a channel notification section configured to notify the mobile station of a second radio channel, having an allocation effective period of two or more frames to the mobile station, newly allocated by the channel allocation section when the allocation effective period of the first radio channel which has been allocated by the channel allocation section is expired;

wherein the notification instructs the mobile station to use the first radio channels notified from the base station until an allocation effective period of the first radio channels expires and the second radio channels notified from the base station until an allocation effective period of the second radio channels expires.

8. A mobile station for performing communication to and from a base station via at least a part of a plurality of radio channels, wherein the base station comprises:

a channel allocation section configured to allocate a first radio channel having an allocation effective period of two or more frames to the mobile station; and a channel notification section configured to notify the mobile station of a second radio channel, having an allocation effective period of two or more frames to the mobile station, newly allocated by the channel allocation section when the allocation effective period of the first radio channel which has been allocated by the channel allocation section is expired, and wherein the mobile station uses the first radio channels notified from the base station until an allocation effective period of the first radio channels expires and the second radio channels notified from the base station until an allocation effective period of the second radio channels expires.

9. A wireless communication method for use in communication between a first communication device and a second communication device, which is performed via at least a part of a plurality of radio channels, the wireless communication method comprising the steps of:

allocating, by the first communication device, a first radio channel having an allocation effective period of two or more frames to the second communication device;

notifying, by the first communication device, the second communication device of a second radio channel, having an allocation effective period of two or more frames, newly allocated to the second communication device when the allocation effective period of the first radio channel which has been allocated to the second communication device is expired; and using, by the second communication device, the first radio channels notified from the first communication device until an allocation effective period of the first radio channels expires and the second radio channels notified from the base station until an allocation effective period of the second radio channels expires.

* * * * *